July 21, 1964 D. B. BOIES ETAL 3,141,324
COOLING WATER TEST UNIT
Filed July 19, 1960 3 Sheets-Sheet 1

INVENTORS:
DAVID B. BOIES
ARTHUR J. FREEDMAN
BY Marzall, Johnston, Cook & Root
ATT'YS

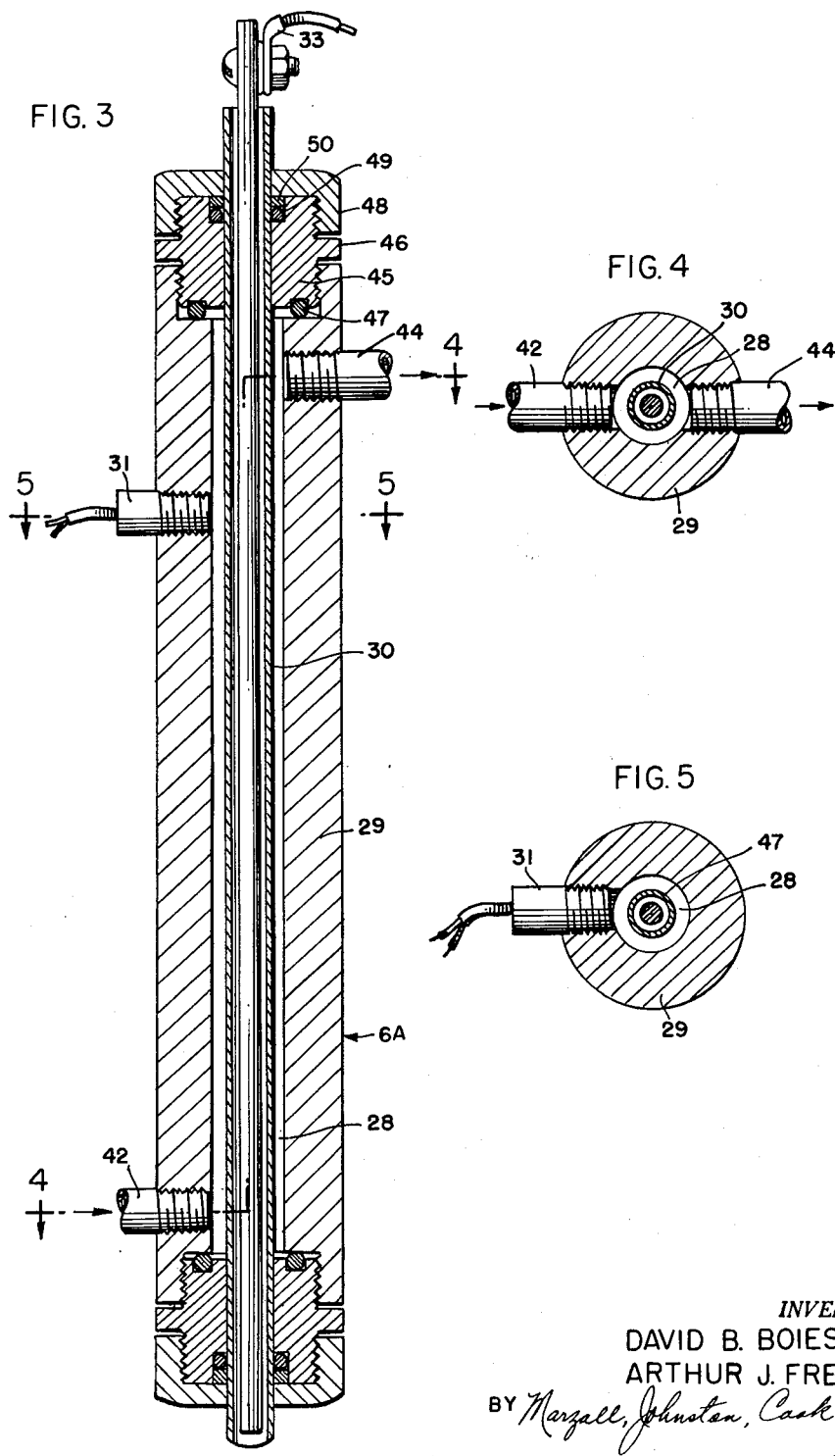

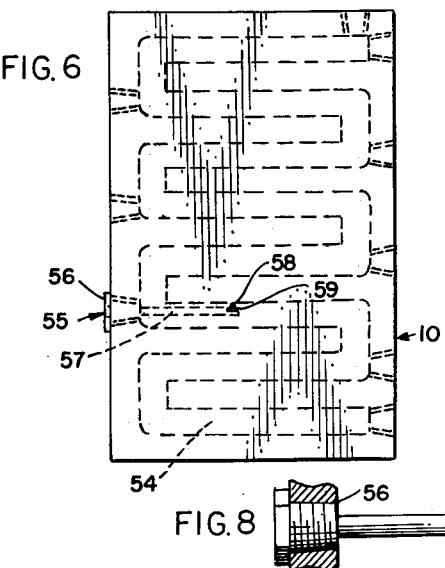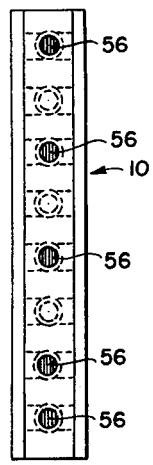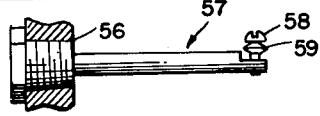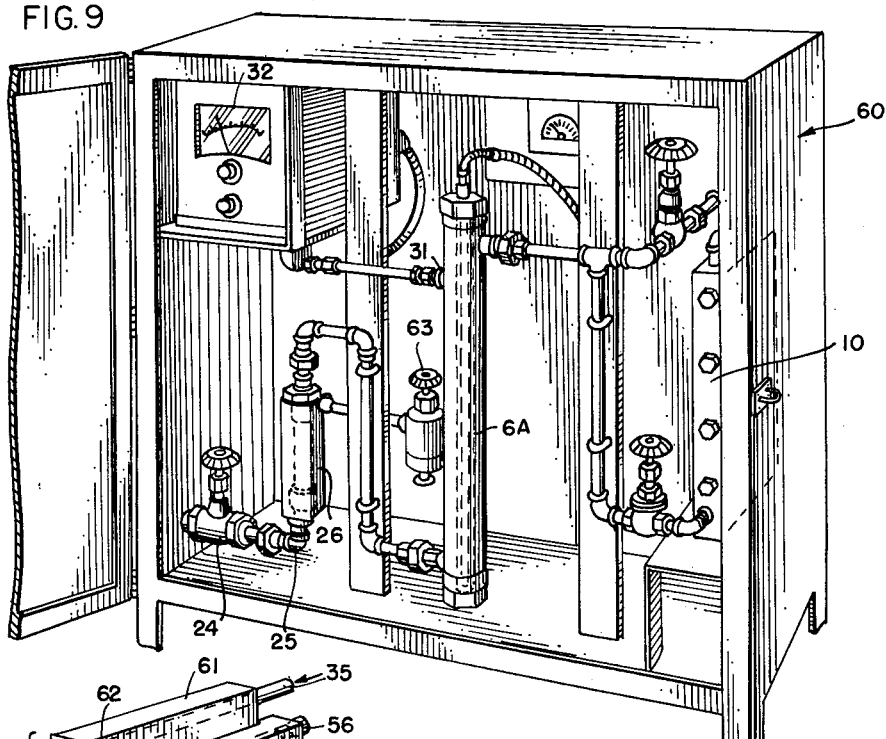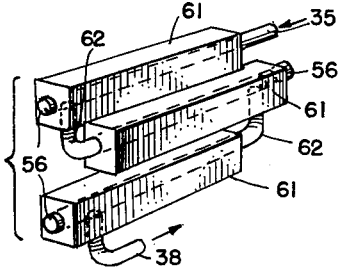

United States Patent Office 3,141,324
Patented July 21, 1964

3,141,324
COOLING WATER TEST UNIT
David B. Boies, Chicago, and Arthur J. Freedman, Chicago Heights, Ill., assignors to Nalco Chemical Company, Chicago, Ill., a corporation of Delaware
Filed July 19, 1960, Ser. No. 43,828
4 Claims. (Cl. 73—53)

The present invention is directed to apparatus for testing the corrosiveness of water and other liquids and to apparatus for determining the degree to which such liquids form deposits on metal and other surfaces.

A wide variety of chemicals are added to water systems to inhibit corrosion and deposition on metal surfaces. The effectiveness of these inhibitors depends upon such factors as the temperature of the water, flow rates, the metal in contact with the water, the nature of materials dissolved in the water, etc. These factors vary widely in different systems, and may change from day to day or month to month. It has been found, therefore, that a compound which is effective in preventing corrosion and deposition during one period may not work satisfactorily at a later date. For this reason, it is desirable to test the corrosion and deposit inhibiting ability of any particular water treatment agent or agents on a continuous basis.

While laboratory corrosion tests are useful for many purposes, they often are not completely satisfactory. Plant conditions of flow rate, pressure, surface to volume ratios, etc., often cannot be duplicated in the laboratory. Furthermore, it is difficult to interpret such tests in view of varying time factors. Although considerable effort has been expended to find an "accelerated corrosion test" which would be suitable for many water systems, such efforts have not been successful primarily because of the difficulty of reproducing the different kinds of environment which are encountered in the field.

Field testing of corrosion inhibitors customarily is carried out with coupons or electrical resistance probes inserted into water lines or basins. Over intervals of several months, these methods will provide an estimate of corrosion rates on pipe walls, valves and other nonheated metal surfaces. Testing of the effectiveness of corrosion inhibitors on heat transfer equipment in the field, however, is much more difficult. At present, corrosion rates on heat transfer equipment can be measured only by inspecting the equipment during infrequent shutdowns. During the periods between shutdowns, serious corrosion may occur resulting in forced shutdowns and even creating dangerous conditions.

The deposition of insoluble materials on heat transfer surfaces in plant equipment is a costly problem, requiring the use of higher heat fluxes and often causing shutdowns. The build-up of deposits sometimes can be detected by measuring heat transfer rates and changes in required water-flow velocities. These methods, however, are very insensitive. Considerable deposition may occur before heat transfer rates and water-flow velocities are significantly reduced. In such cases, the control of further deposition is difficult.

One of the objects of the present invention is to provide apparatus for rapidly testing the effectiveness of corrosion and deposition inhibiting agents in field systems.

Another object of the invention is to provide apparatus which will permit the continuous observation and measurement of the effectiveness of corrosion and deposition inhibiting agents.

Still another object is to provide apparatus which is suitable for use in laboratory tests.

Another object is to provide apparatus which will enable one to correlate laboratory and field data accurately and rapidly.

Another object is to provide apparatus which is capable of reproducing temperature conditions and other environmental factors in an accurate and uncomplicated manner.

Additional objects will become apparent to those skilled in the art from the following detailed description of the invention taken in connection with the drawings in which:

FIGURE 3 is a side elevation and diametric cross-section of a heat transfer unit of the invention;

FIGURE 4 is a cross-sectional view of the heat transfer tube taken along line 4—4 of FIG. 3;

FIGURE 5 is a cross-sectional view of the heat transfer tube taken along 5—5 of FIG. 3;

FIGURE 6 is a side elevation of a coupon holder of the subject invention;

FIGURE 7 is an end view of the coupon holder of FIG. 6;

FIGURE 8 is a side elevation of a plug and coupon;

FIGURE 9 is a perspective view of a portable test unit embodying the subject invention; and FIGURE 10 is a perspective view of a preferred coupon holder.

Figure 1:
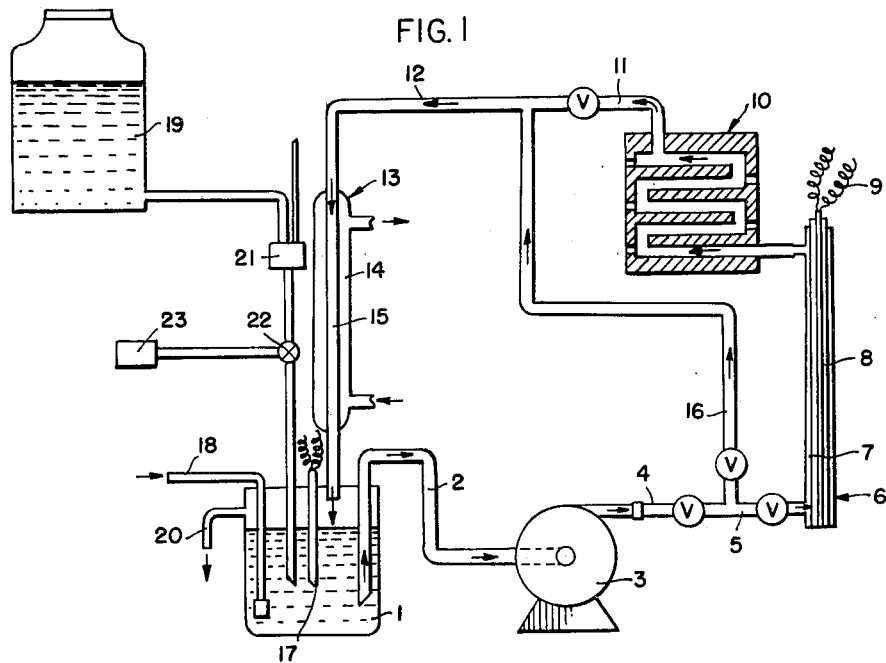
FIGURE 1 is a diagrammatic representation of a laboratory test unit embodying the subject invention.

In the diagrammatic drawing of FIG. 1, test water contained in test vessel 1 is drawn through tubing or pipe 2 into pump 3. From pump 3 the water ordinarily passes through conduits 4 and 5 and into heat transfer unit 6. The water is circulated through an annular space 7 between a metal tube test specimen 8 and the transparent outer wall of heat transfer unit 6. Metal tube 8 is heated by means of wires 9 connected to a heat source (not shown) extending the length of tube 8. After leaving heat transfer unit 6, the water passes through probe or coupon holder 10, preferably also having transparent walls. On leaving coupon holder 10, the water passes through conduits 11 and 12 and into heat exchanger 13. The temperature of the water is lowered in the heat exchanger by means of a cooling liquid which circulates through annular space 14 around conduit 15. After leaving the heat exchanger the water is returned to test vessel 1. Alternatively, water leaving pump 3 can bypass the heat transfer unit and coupon holder and can flow through conduit 16 and then back to heat exchanger 13 and test vessel 1. The temperature of the system is regulated by thermostat 17 within vessel 1, which controls the flow of cooling liquid in heat exchanger 13. Air can be bubbled through the water in vessel 1 through tube 18. Periodically, a small portion of the water in vessel 1 is replaced with fresh treated water from reservoir 19, and an equal portion overflows into drain 20 of vessel 1. Water from reservoir 19 passes through feed chamber 21 and solenoid valve 22 which is controlled by timer 23. This arrangement similates continuous blow-down and affords a control of the dissolved solids in test vessel 1.

The efficiency of the water treatment process is determined in the laboratory test unit both by visual and gravimetric means. The progress of corrosion, scaling, and fouling is followed visually during the test by observing metal tube 8 and metal coupons through the transparent outer walls of heat transfer unit 6 and coupon holder 10. At the end of the test, metal tube 8 can be removed, dried, weighed, and again weighed after any scale or deposits that have formed have been removed. A comparison of these weights with the weight of the tube before the test accurately measures the degree of corrosion and fouling that has taken place. Additional corrosion measurements can be obtained by inspection and weighing of coupons which have been maintained in contact with water passing through coupon holder 10.

For purposes of this disclosure, the term corrosion is defined as the reaction of a metal with its environment resulting in loss of metal either generally over the surface or from localized areas. Corrosion products are the solid reaction products of the corrosion reaction. Fouling and deposition are used as synonyms referring to the laying-down of solid deposits on a metal surface. These deposits generally consist of three types: corrosion products, suspended matter carried in the water, and scaling products. Scaling refers specifically to the deposition of minerals from the water (such as calcium carbonate and calcium phosphate).

It should be understood that although corrosion and fouling are independent phenomena, they often occur together. That is, high corrosion rates often (but not necessarily) result in severe deposition on the metal surface.

Figure 2:
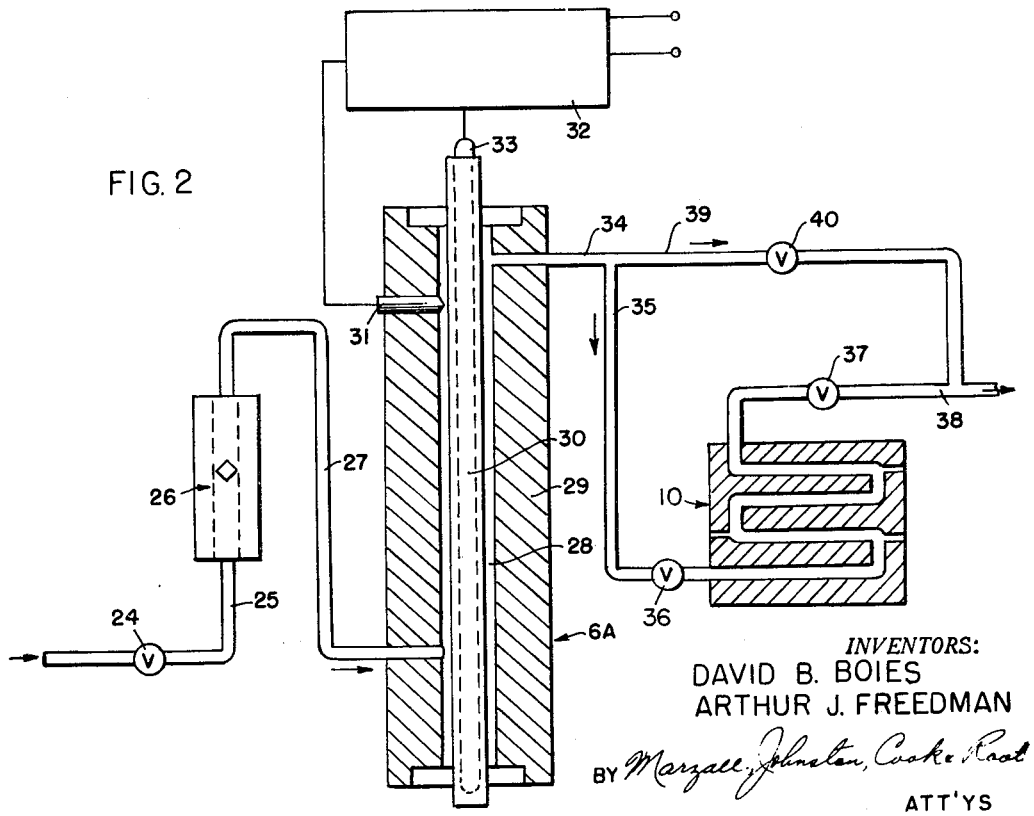
FIGURE 2 is a diagrammatic representation of a field test unit embodying the subject invention.

In FIG. 2, a field test unit embodying the present invention is shown diagrammatically. Water from the cooling system that is being tested is forced by the pressure of the system through control flow valve 24 through conduit 25 and past rotometer 26. Rotometer 26 determines the amount of water passing through the test unit per given unit of time. From rotometer 26 the water flows through pipe 27 into annular space 28 of heat transfer unit 6A. As in the laboratory unit, the outer wall 29 of heat transfer unit 6A is made of glass, polymethylmethacrylate, or some other transparent material. Water flowing through annular space 28 contacts metal specimen tube 30. Thermocouple 31 is placed in such a position so that it measures the temperature of the water which is in contact with tube 30. In a preferred embodiment of the invention, the thermocouple is connected to a limit type pyrometer controller 32 which is set to turn off the power to heater 33 if the temperature of the water exceeds a preset limit (fail-safe operation). Water leaves annular space 28 through conduit 34 and then ordinarily passes through pipe 35 and valve 36 to coupon holder 10, preferably also having transparent walls. From coupon holder 10 the water flows past valve 37 and through pipe 38. The water is then returned to the cooling tower basin. Alternatively, water from conduit 34 passes into conduit 39 and through valve 40 and then back to the cooling tower basin. This bypass enables an operator to remove coupons from coupon holder 10 while maintaining a flow of water around metal tube 30.

FIG. 3 shows in somewhat greater detail the structure of heat transfer unit 6A. Outer wall 29 of unit 6A is formed from a transparent material such as glass, polymethylmethacrylate, etc. Water enters the unit through conduit 42 and passes through annular chamber 28 and out conduit 44. Member 45, including hexagonal nut portion 46, is screwed into outer wall 29. O ring 47 seals off annular chamber 28. Hexagonal nut 48 is threaded so as to engage the upper portion of member 45. O ring 49 and ring follower 50 surround tube 30. The construction is the same at both ends of the tube. Specimen tube 30 is made of a suitable metal for testing the corrosiveness of the particular water system. Commonly, tube 30 will be made of steel, brass, copper, aluminum or stainless steel. Thermocouple 31 measures the temperature of the water passing through annular chamber 28. The thermocouple is connected to a limit type control device which acts to turn off the power to heater 33 when a particular temperature has been reached.

FIGS. 4 and 5 are crossed-sectional views taken through lines 4—4 and 5—5 of FIG. 3. In FIG. 4, conduits 42 and 44 are shown to communicate with annular space 28 which surrounds tube specimen 30. As is pictured in FIG. 5, thermocouple 31 is in contact with annular space 28.

FIG. 6 is a side elevation of coupon holder 10 which is suitable for use in the subject apparatus. The housing of the coupon holder can be made of glass, polymethylmethacrylate or similar transparent material. Water entering the coupon holder passes through S-shaped conduit 54. Coupon unit 55 is composed of plug 56, rod 57, and clamp 58. Clamp 58 holds coupon 59. The coupon is exposed within conduit 53 to the cooling water.

FIG. 7 is an end view of the coupon holder of FIG. 6. Plugs 56 of coupon units 55 are removably inserted within holder 10.

FIG. 8 is an enlarged view of coupon unit 55 which includes plug 56, rod 57, clamp 58, and coupon 59.

FIG. 9 is a perspective view of a complete portable test unit. Preferably, box 60 is made of a rustproof metal. Water entering the unit passes through valve 24, through conduit 25 and then past rotometer 26. As was explained in connection with FIG. 2, the water flows through heat transfer unit 6A and then through coupon holder 10. The temperature of the water passing through heat unit 6A is measured by thermocouple 31 which in turn activates fail-safe control unit 32. As is evident from the drawing, the unit is compact and can easily be transported from plant to plant.

As a safety feature, the interior of box 60 may be pressurized by admitting thereto compressed air or an inert gas by means of a pressure reducing valve 63. This prevents combustible or explosive gases from contacting the electrical circuits contained in the box.

FIG. 10 is a perspective view of a preferred embodiment of coupon holder 10. The holder is composed of individual units 61. Water from inlet conduit 35 (see FIG. 2) contacts coupons within unit 61, and then flows into conduit 62. Eventually, the water leaves the last unit through conduit 38 (see FIG. 2). One of the major advantages of this coupon holder lies in the fact that it can easily be disassembled for cleaning with a swab or bottle brush. As has been indicated, the walls of unit 61 preferably are transparent. Plugs 56 are removably positioned within each of the units.

The outer walls of heat transfer unit 6 must be constructed of a transparent material so that any corrosion and deposition taking place on the surface of the tube can be continuously observed. In most instances, glass provides satisfactory material for forming the outer walls of the heat transfer unit. Where there is a danger of glass breakage, however, plastics such as methylmethacrylate polymers are used for this purpose. It is preferred that the outer walls of coupon holder 10 also be transparent.

The subject test apparatus provides a highly satisfactory means for determining the proper chemical make up of a cooling fluid. Inasmuch as the heat transfer surfaces and test specimens can be kept under constant surveillance, changes can be made in the amount or nature of the chemicals added to the water system whenever such a change is deemed to be necessary. The test apparatus also is suitable for use in the laboratory as well as in the field.

Obviously many modifications and variations of the invention as hereinbefore set forth may be made without departing from the spirit and scope thereof, and therefore only such limitations should be imposed as are indicated in the appended claims.

We claim:

1. Apparatus for testing cooling waters which comprises in combination: a heat transfer unit, said heat transfer unit including a metal tube, heating means for said metal tube, and a transparent outer wall, said metal tube and transparent outer wall defining an annular space through which water passes; conduit means for continuously delivering water from any given source to said heat transfer unit; a coupon holder, said coupon holder including a conduit through which water passes, said coupon holder including means for maintaining metal coupons in contact with water passing through said conduit of said coupon holder; conduit means for continuously delivering water from said heat transfer unit to said coupon holder; and heat sensing means for controlling the operation of said heat transfer unit.

2. Apparatus for continuously testing cooling waters which comprises in combination: a reservoir for holding said cooling water; a test vessel; conduit means for delivering said water from said reservoir to said test vessel; a heat transfer unit, said heat transfer unit including a metal tube, heating means for said metal tube, and a transparent outer wall, said metal tube and said transparent outer wall defining an annular space through which said water passes; pump means for continuously delivering water from said test vessel to said heat transfer unit; a coupon holder, said coupon holder including a conduit through which said water passes; means for maintaining metal coupons in contact with water passing through said conduit of said coupon holder; conduit means for continuously returning said water from said coupon holder to said test vessel; and means for controlling the temperature of the water returning to said test vessel.

3. Apparatus for continuously testing cooling waters which comprises in combination: a reservoir for holding said cooling water; a test vessel; conduit means for delivering said water from said reservoir to said test vessel; a heat transfer unit, said heat transfer unit including a metal tube, heating means for said metal tube, and a transparent outer wall, said metal tube and said transparent outer wall defining an annular space through which said water passes; pump means for continuously delivering water from said test vessel to said heat transfer unit; a coupon holder, said coupon holder including a conduit through which said water passes; means for maintaining metal coupons in contact with water passing through said conduit of said coupon holder; conduit means for continuously returning said water from said coupon holder to said test vessel; conduit means for returning circulated water to said test vessel and thereby bypassing said heat transfer unit and said coupon holder; and means for controlling the temperautre of the water returning to said test vessel.

4. Apparatus for testing cooling waters which comprises in combination: a cooling basin; a heat transfer unit; conduit means for continuously delivering said cooling water from said basin to said heat transfer unit; metering means between said cooling basin and said heat transfer unit for determining the amount of water delivered to said heat transfer unit, said heat transfer unit including a metal tube, heating means for said tube, a transparent outer wall, said transparent outer wall and said metal tube defining an annular space through which said water passes, and heat sensing means for measuring the temperature of said water passing through said annular space; a coupon holder, said coupon holder including a conduit through which water passes; means for holding coupons in contact with water passing through said conduit of said coupon holder; conduit means for delivering water to said coupon holder from said heat transfer unit; conduit means for continuously returning said water from said coupon holder to said basin; and additional conduit means for continuously delivering water from said heat transfer unit to said basin and thereby bypassing said coupon holder.

References Cited in the file of this patent

UNITED STATES PATENTS 2,897,060     Dieman _____ July 28, 1959

OTHER REFERENCES

Publication by Wachter et al. in Chemical Engineering Progress, vol. 43, No. 6, June 1947, pp. 315–325.